March 1, 1960 F. E. LONG 2,927,029
METHOD OF PACKAGING FOOD SLICES
Filed Sept. 24, 1957

INVENTOR
FLORREN E. LONG

BY Mason, Porter, Diller & Stewart,
ATTORNEYS

United States Patent Office 2,927,029
Patented Mar. 1, 1960

2,927,029
METHOD OF PACKAGING FOOD SLICES

Florren E. Long, Fredericktown, Ohio, assignor to Continental Can Company, Inc., New York, N.Y., a corporation of New York Application September 24, 1957, Serial No. 685,885

3 Claims. (Cl. 99—171)

This invention relates to the packaging of bacon slices and like food products, and particularly concerns the preparation of a product in which the individual pieces may be easily separated under refrigeration conditions.

Bacon has a high content of a fat which solidifies under refrigeration conditions (40–50 degrees F.), so that there is a strong adhesion or sealing together of the individual slices; and the consumer has difficulty in separating them, often tearing the slices. It is undesirable to warm the mass so that a few slices can be removed, and then chill the residual mass again.

It has become a custom for the butcher to cut bacon and like food products into slices or portions ready for cooking and/or serving. The products are kept under refrigeration, and tend to cling together so that they are not easily separated while frozen. A practice has existed of interleaving the slices with waxed paper, metal foil, cellophane, or other material, for example by pleating such a film in a zigzag or accordion style with an individual slice located in each fold; but the costs have made the practice economically non-feasible for quantity employment, and there is the difficulty of removal or folding-under of the interleaved material after some slices have been removed, with probable contact with other bodies.

It has been found that by coating the individual slices with a water-swelling dust or solution before assembling them into the package, the fat can be prevented from physically sealing the slices together.

The material must be non-toxic and essentially undetectable by the customer, either to the eye or during the cooking procedure.

The sodium salt of carboxymethyl cellulose, known as carboxymethyl cellulose gum, has been found highly satisfactory.

After slicing, the top surfaces of the slices were dusted with the dry gum powder, at the rate of 0.1 to 0.2 pound per thousand square feet of bacon surface. The powder was placed in a container and agitated by dry air so that it became suspended therein, and a stream of the dust-laden gas was then projected onto the slices. The slices were then shingled or laid upon one another with overlapping, and encased in a cellophane wrapping, in the normal commercial manner, and stored under normal refrigerated conditions. After three weeks, the dusted slices could be easily separated without warming; and gave no detectable difference during the usual frying, by behavior, appearance or flavor. Control slices, similarly packed and stored but without the pre-dusting, could not be separated without tearing the slices.

Both cut surfaces can be dusted, if desired, wherewith a lesser amount can be employed per unit of surface area. The coating substance can also be employed in the form of an aqueous solution, preferably viscous, and brushing or roller-coating upon the food material.

Figure 1:
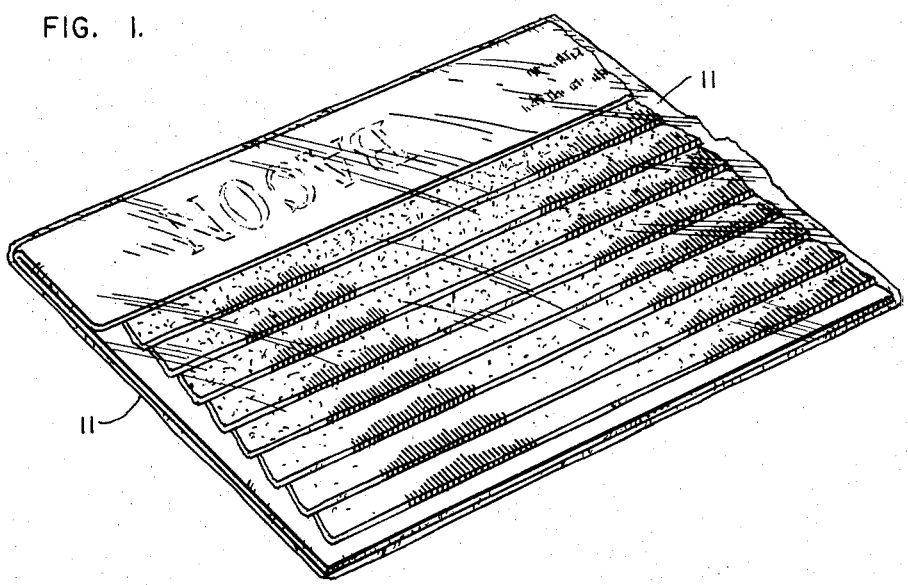
Fig. 1 is a perspective view of a package made according to this invention.

In Fig. 1, slices 10 of bacon are shown as juxtaposed in shingled or partially overlapping form. The mass is enclosed in a sealed wrapping 11 e.g. of cellophane, which has been partly broken away to display the contents.

Figure 2:
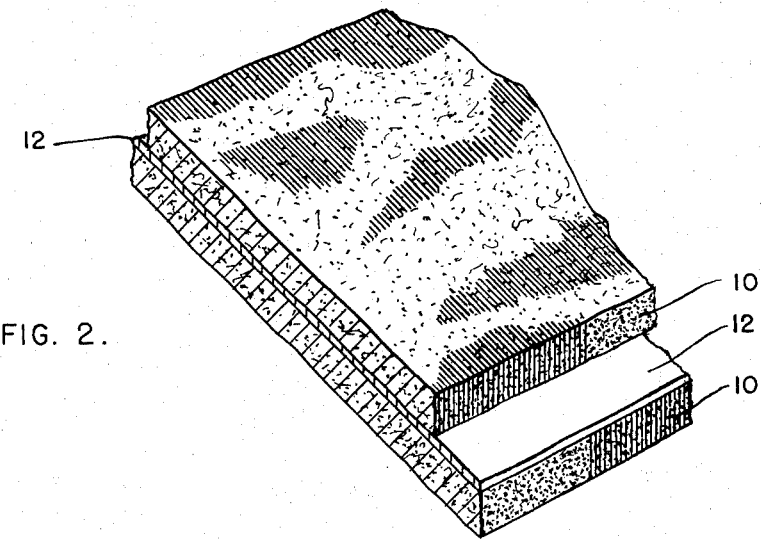
Fig. 2 is a section through a part thereof.

In Fig. 2, two slices 10 are shown with the intervening film 12 of edible water-swelling material therebetween, noting that the relative thickness of this film has been greatly increased for the illustration.

The cellulose gum is water-swelling and ultimately water soluble. The dust absorbs moisture from the slices and is transformed into a water-clear film which is not easily detectable even in concentration of two pounds per thousand square feet. In practice, it has been found that 0.1 pound or even less per thousand square feet is effective in permitting separation with most commercial bacons, and that 0.2 to 1 pound is always effective for conferring the desired release properties.

It has further been noted that the treated bacon slices do not mold over prolonged storage periods, whereas the untreated control slices developed mold within a relatively short storage period. This apparently occurs by the exclusion of oxygen and mold from the meat surface by the film of cellulose gum which has no food value for mold growth.

Other products which are subject to sticking by the solidification of fat, and to molding, such as other meats and cheese, under refrigerated conditions may be likewise treated: and other edible water-swelling materials which form films with water can be utilized, preferably those which are not elaboration substrates for molds.

What is claimed is:

1. The method of packaging slices of fat-containing meat and cheese for refrigerated storage, which comprises the steps of dusting a coating of water-swelling cellulose gum powder to the surface of the slice and juxtaposing another slice with its surface upon and in contact with the said coated surface.

2. The method of packaging bacon, which comprises slicing of the bacon, dusting at least one cut surface with powdery sodium salt of carboxymethyl cellulose, juxtaposing the cut surface of another slice upon and in contact with the said first coated surface, and wrapping.

3. A bacon package comprising juxtaposed slices of bacon, and films of sodium salt of carboxymethyl cellulose between and contacting the surfaces of adjacent slices, said films containing water derived from the bacon slices.

References Cited in the file of this patent

UNITED STATES PATENTS

| | | |
|---|---|---|
| 2,558,042 | Cornwell | June 26, 1951 |
| 2,565,976 | Mayer et al. | Aug. 28, 1951 |
| 2,753,107 | Ringler | July 3, 1956 |
| 2,803,214 | Hensgen | Aug. 26, 1957 |